(No Model.)
F. HART.
ADJUSTABLE BEARING.
No. 475,311. Patented May 24, 1892.
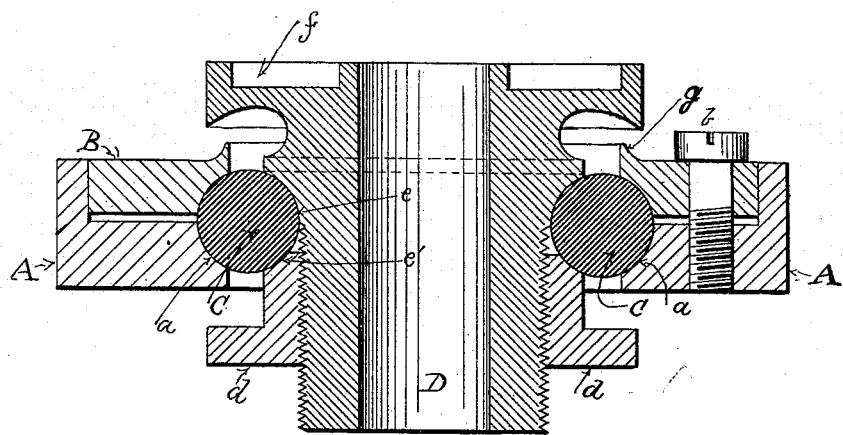
Witnesses:
Robt. F. Gaylord
Raphael Netter
Inventor
Frederick Hart

UNITED STATES PATENT OFFICE.

FREDERICK HART, OF POUGHKEEPSIE, NEW YORK.

ADJUSTABLE BEARING.

SPECIFICATION forming part of Letters Patent No. 475,311, dated May 24, 1892.

Application filed March 30, 1892. Serial No. 427,079. (No model.)

*To all whom it may concern:*

Be it known that I, FREDERICK HART, a subject of the Queen of Great Britain, and a resident of Poughkeepsie, in the county of Dutchess and State of New York, have invented certain new and useful Improved Adjustable Bearings, of which the following is a specification.

My invention relates to bearings, and is especially designed for those used in centrifugal separators or like apparatus where a rubber or other elastic ring is interposed between the bearing and its support for the purpose of allowing the bearing to come into line with its shaft and permitting of some vibration, so that the rotating part of the apparatus may revolve upon its center of gravity.

My invention consists of a bearing constructed with an outer annular recess for receiving an elastic ring and provided with a nut adjustable upon the bearing for the purpose of reducing such recess and holding the bearing tighter within the ring.

The figure is a sectional elevation of my improved bearing, in this instance shown in a vertical position, A being the bearing-support having an annular recess $a$, with a top plate B, (such as long used in machines of a kind for which my improvement is applicable,) attached by screws $b$ to the support A, and thus capable of being brought in close proximity to the latter for the purpose of partially compressing the elastic ring C within the recess $a$ and holding it tighter.

D is a bearing with an outer nut $d$ threaded and adjustable thereon, an annular recess $e\ e'$, constructed partially in the bearing and partially in the nut, serving to receive the inner portion of the ring C, and by screwing the nut upward said ring will be held tighter by the bearing.

As has been customary for a long time in a class of machines to which my invention is applicable, the top of the bearing is provided with an annular oil-groove $f$ and overhangs an upward annular projection $g$ of the plate B, so that oil escaping over the top of the bearing cannot reach the top of the elastic ring and injure it. The recess $a$ may be entirely within the support A, and the top plate B may be thus entirely dispensed with by shaping the support to meet the various requirements.

I do not claim the top plate B nor its special construction nor the overhanging construction of bearing D, as all have been long in use, and I am also aware that for the purpose of tightening such an elastic ring, as shown, an inner or gland nut screwing into the support A might be used, as illustrated in Patent No. 411,038 of September 17, 1889; but one object of my invention in making the bearing itself, which is separate and readily detachable, adjustable upon the ring is to avoid the trouble and difficulty otherwise met in handling heavy supports for boring and tapping where the adjustability is made in the support.

I claim—

In combination with a bearing-support constructed with an inner annular recess and an elastic ring held in such recess, a bearing having an outer annular recess, and an outer nut adjustable upon such bearing to reduce the size of said recess and tighten the elastic ring therein, substantially as set forth.

Signed at New York, in the county of New York and State of New York, this 29th day of March, A. D. 1892.

FREDERICK HART.

Witnesses:
C. E. OAKLEY,
GEO. W. OAKLEY.